United States Patent [19]

Silverman

[11] Patent Number: 4,951,336
[45] Date of Patent: Aug. 28, 1990

[54] CONTOURED SUPPORT CUSHIONS

[75] Inventor: Michael W. Silverman, Highland Park, Ill.

[73] Assignee: Pin Dot Products, Morton Grove, Ill.

[21] Appl. No.: 332,051

[22] Filed: Apr. 3, 1989

[51] Int. Cl.$^5$ .............................................. A47C 7/02
[52] U.S. Cl. .......................................... 5/481; 5/461; 5/464; 297/459
[58] Field of Search ................... 5/431, 461, 464, 468, 5/481; 297/458, 459, DIG. 1

[56] References Cited

U.S. PATENT DOCUMENTS

| | | |
|---|---|---|
| 2,855,986 | 10/1958 | Engelen, Sr. . |
| 3,177,036 | 4/1965 | Halter . |
| 3,308,491 | 3/1967 | Spence . |
| 3,341,251 | 9/1967 | Costin ................... 297/459 |
| 3,381,999 | 5/1968 | Steere, Jr. ............. 5/468 X |
| 3,389,935 | 6/1968 | Getz et al. ........... 297/458 X |
| 3,503,649 | 3/1970 | Johnson . |
| 3,566,423 | 3/1971 | Reinfeldt ............. 297/458 X |
| 3,663,973 | 5/1972 | Spence . |
| 3,689,949 | 9/1972 | Weinstein et al. . |
| 3,721,232 | 3/1973 | Trenchard . |
| 3,736,022 | 5/1973 | Radke ................ 297/458 X |
| 3,787,908 | 1/1974 | Beck et al. . |
| 3,833,259 | 9/1974 | Pershing .............. 5/481 X |
| 4,493,877 | 1/1985 | Burnett . |
| 4,588,229 | 5/1986 | Jay . |
| 4,615,856 | 10/1986 | Silverman . |
| 4,637,789 | 1/1987 | Netznik . |
| 4,660,238 | 4/1987 | Jay ......................... 5/431 |
| 4,663,951 | 8/1988 | Silverman . |
| 4,726,624 | 2/1988 | Jay . |
| 4,755,411 | 7/1988 | Wing et al. ........... 297/DIG. 1 X |

FOREIGN PATENT DOCUMENTS 918227 9/1954 Fed. Rep. of Germany .
8607528 12/1986 PCT Int'l Appl. ................. 297/458

OTHER PUBLICATIONS

Advertisement from "JAY Medical", 806 Walnut Avenue, Boulder, Colo. 80302, entitled The Most Advanced Wheelchair Seating System Available Today—The Jay Cushion.

Primary Examiner—Michael F. Trettel
Attorney, Agent, or Firm—Emrich & Dithmar

[57] ABSTRACT

A vacuum formed, foam-filled seat or back cushion having a covering and an inner portion comprised of a first type of foam further includes an insert comprised of a second type of a softer foam for use in high pressure areas in the support surface. The surface of the cushion is contoured in accordance with an intended user's dimensions and support surface configuration for improved user support and comfort, particularly for a non-ambulatory, handicapped person. The softer foam insert is formed integrally with the remaining foam portion of the cushion to provide a smooth, continuous, secure support surface. The cushion's covering is formed about the foam insert in a manner which prevents stretching or tearing of the covering due to the difference in firmness of the underlying foam portions. The cushion includes a rigid base formed integrally with the foam core as well as rigid internal lateral reinforcements for user support and seating stability. Provision is made during cushion formation for the inclusion of lap belt slots and an incontinence relief tube extending through a seat cushion as well as undercut front edge for a user with tight hamstrings.

16 Claims, 4 Drawing Sheets

CONTOURED SUPPORT CUSHIONS

BACKGROUND OF THE INVENTION

This invention relates generally to seat and back support cushions and is more particularly directed to improvements in seating support cushions such as those adapted for use by a non-ambulatory, handicapped person.

Those who are non-ambulatory are restricted to either lying down or sitting for extended periods of time. Bony protuberances give rise to areas of excessive pressure restricting blood flow to the surrounding tissue. In order to avoid such problems, the person must be frequently moved in those areas to which blood circulation has been restricted and massaged in attempting to prevent the formation of an ulcer.

In addressing this potential problem for the bed-ridden as well as for those restricted to a wheel chair, attempts have been made to limit localized pressure and to distribute this pressure over greater areas of the body. One approach makes use of water-filled bladders. In the area of seating, liquid filled plastic bags have been used to reduce pressure on the ischials and coccyx. Because of the limited compressibility of the liquid used in the flexible plastic bag, this approach has not eliminated formation of pressure sores for those who remain in the seated position for extended periods. In order to increase the compressibility, gels having a variety of compositions have been incorporated in the plastic bag. These gels are typically comprised of a stable, chemically inert material which freely flows within the plastic bag. Unfortunately, even the gels used offer only limited compressibility and internal displacement and have not been particularly effective in improving the comfort and health of the wheel chair-ridden.

In order to provide for complete support, it is necessary to displace a weight of liquid equal to the weight of the body being supported. As a result, liquid-type systems capable of eliminating pressure sores are necessarily very heavy, bulky and difficult to utilize in a bed much less in a wheel chair. When the weight of the liquid displaced is less than that of the body weight of the user, the user will be exposed to increased pressures.

Liquid systems rely on a water-tight envelope and are thus subject to inadvertent punctures and/or leaks with a resulting loss of support. Gas (air) filled bags have also been used, but they too are subject to puncture and leakage. These fluid filled systems must be also be capable of compensating for temperature variations, pressure variations and the weight of the user.

These prior art fluid filled cushions also do not lend to the stability of the user and frequently create a fear of falling from the chair. For example, when one leans to one side of the chair, or shifts his weight in one direction, the fluid moves away from the lower side and into the higher side of the cushion, exaggerating the tendency to lean. This results not only in a person leaning more on a fluid filled cushion than on a solid cushion, but creates a feeling of instability and a fear of leaning too far to one side because of the resulting instability. This sense of instability inhibits the user's ability to maneuver the wheel chair and thus further restricts his or her self-reliance and freedom. Moreover, fluid filled bags are incapable of providing any lateral support which is frequently essential for those suffering from a spinal deformity or injury.

The present invention overcomes the aforementioned limitations by providing a contoured support cushion for either back or seat support having a compressible interior of a first type of foam and a flexible cover disposed thereover. The cushion further includes an insert of a second type of softer foam disposed within the first foam material to accommodate areas of support subject to high pressure. The cushion also includes a rigid base integrated with the foam interior for improved support and to facilitate mounting of the cushion to a support base as well as lateral reinforcement disposed within and integral with the foam interior of the cushion.

OBJECTS AND SUMMARY OF THE INVENTION

Accordingly, it is the object of the present invention to provide an improved seating support cushion having a custom contoured support surface which is particularly adapted for extended use by one who is non-ambulatory.

Another object of the present invention is to provide a support cushion particularly adapted for extended use by incorporating softer portions in those areas of high pressure.

Another object of the present invention is provide a form filled seating cushion having an integral rigid base for improved firmness and to facilitate mounting of the cushion in a support base.

A further object of the present invention is to provide a form filled cushion of unitary construction having one or more soft spots for those areas of high pressure and a continuous, comfortable, attractive covering.

A still further object of the present invention is to provide a foam filled seat cushion having lateral supports for a user, wherein the lateral supports are comprised of a rigid member embedded in and integral with the cushion's foam interior.

Still another object of the present invention is to provide in a foam filled cushion having an integral covering, an improved method for forming slots or apertures therein which may be used as an incontinence relief tube, for lap belt positioning, etc.

It is another object of the present invention to provide an improved method for forming a foam filled cushion having a vinyl covering and a plywood bottom portion as an integral, unitary structure.

This invention contemplates a support cushion adapted for attachment to and mounting in a support base, the cushion comprising: a compressible, resilient core comprised of a curable foam and having a contoured upper surface and a generally planar lower surface; a rigid, generally planar base engaging and integrally bonded to the lower surface of the core; and positioning means disposed within the core for maintaining the base in intimate contact with the lower surface of the core during the curing thereof so as to form an integral bond between the core and the base.

This invention also contemplates a support cushion having a soft spot to compensate for areas of high support pressure and eliminate pressure sores, the support cushion comprising: a compressible, resilient core comprised of a first foam and having an upper contoured surface and a lower planar surface; a compressible, resilient insert disposed within and bonded to the core and extending between the upper and lower surfaces thereof, wherein the insert is comprised of a second foam which is softer than the first foam of the core to provide the cushion with a soft spot; and a flexible cover disposed in tight fitting relation over the upper surfaces of the core and the insert, the cover including a folded portion disposed between adjacent upper portions of the core and the insert to accommodate the softer insert in preventing stretching and tearing of the cover.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figures 1, 2, 3, 4, 5:
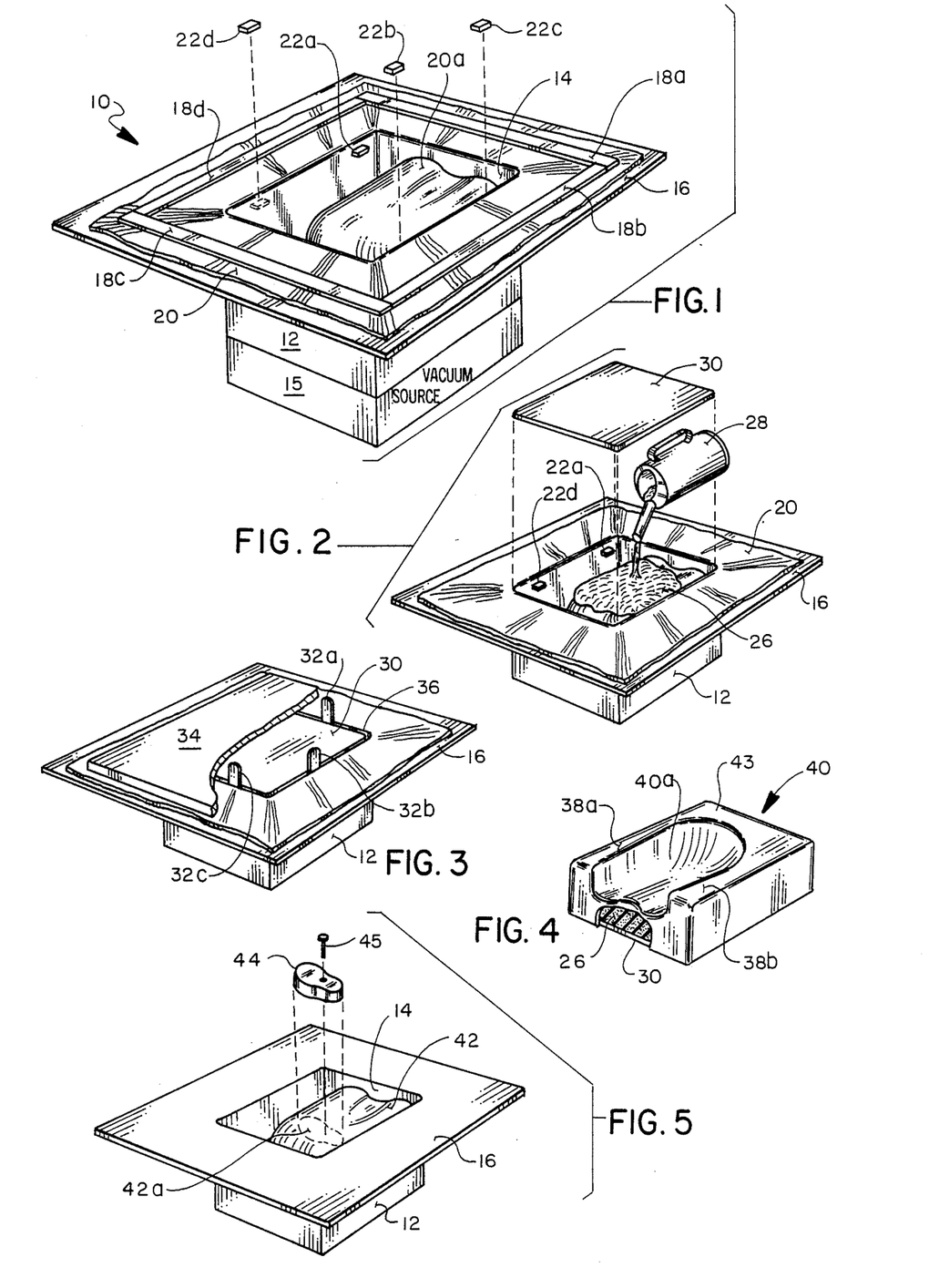
FIG. 1 is a perspective view of an apparatus for forming a contoured support cushion in accordance with the present invention.
FIG. 2 is also a perspective view of an apparatus in accordance with the present invention showing another step in the cushion fabrication process.
FIG. 3 is another perspective view of a cushion fabrication apparatus in accordance with the present invention illustrating yet another step in the cushion fabrication process.
FIG. 4 is a partially cut away perspective view of a foamed filled, contoured cushion in accordance with the present invention.
FIGS. 5-11 show the sequence of steps in forming a foam filled cushion with a soft spot in accordance with one embodiment of the present invention.

Referring to FIG. 1, there is shown a cushion fabrication arrangement 10 in accordance with the principles of the present invention. In the arrangement of FIG. 1, a metal frame 12 having four sides and a bottom with an open upper portion is coupled to a vacuum source 15. The lower portion of the metal frame 12, which is not shown in the figure, is provided with a plurality of apertures which are coupled to and continuous with the vacuum source 15. Disposed about the open upper portion of the metal frame, or pan, 12 is a flat platform 16 also preferably comprised of a rigid, high strength material such as metal. The flat platform 16 is continuous with and extends outward from the upper lip of the metal pan 12. Although the pan 12 is described herein as being metal, it may be comprised of virtually any material which is rigid and of at least moderate strength.

Disposed within the open metal pan 12 and resting on the bottom of the pan is a plaster cast formed in accordance with the support surface of the intended user of the cushion. The plaster cast is not shown in the figure as it is covered by a vinyl or cloth cover 20 and forms an upraised portion 20a of the cover within the metal pan 12. The upper contour of the plaster cast may be formed by any number of available methods to closely conform with the support surface of the intended user. One approach for forming a plaster cast in accordance with the support contour of an intended user is disclosed in U.S. Pat. No. 4,763,951 to Michael W. Silverman, the disclosure of which is incorporated by reference in the instant application. The upper, outer contour of the plaster cast may conform to either the seat or back support surface of an intended user, as the present invention is equally well adapted for fabricating either seat or back support cushions.

With the plaster cast in position within the metal pan 12, the flexible cover 20 is positioned within the metal pan 12 and over the plaster cast so as to extend beyond the periphery of the metal pan and onto the outer peripheral platform 16. The front edge of the plaster cast which is contoured in accordance with the shape of the user's legs is positioned in abutting contact with an adjacent inner wall of the metal pan 12. The cover 20 thus covers the upper surface of the plaster cast as well as portions of the bottom of the metal pan 12 and its inner side walls. A filler, such as clay or tape, can be used to fill any cracks or holes in the sides of the metal pan 12, with the apertures on its bottom surface left open so that a vacuum can be drawn in the metal pan by means of the vacuum source 15. Holes in the sides of the metal pan may be eliminated by forming a recessed portion of a receptacle containing a plaster cast, or other user contoured element, by carving out the upper surface of a solid object. Thus, an approach using a carved out receptacle is also contemplated by the present invention. The carved out receptacle approach also makes use of a vacuum source attached to the bottom of the mold for pulling a vacuum through the mold in drawing the cover into intimate contact with the mold. A plurality of metal strips 18a through 18d are disposed about the open upper portion of the metal pan 12 and rest upon the peripheral portions of the cover 20 in order to maintain the cover flat and in a stretched condition during the cushion fabrication operation. In a preferred embodiment, the metal strips 18a through 18d are coupled such as by welding in an end-to-end manner so as to form a generally rectangular, one piece frame.

Tape may also be positioned over those areas where the plaster mold touches the side walls of the metal pan 12 in order to ensure that the cover 20 is not vacuumed into an open space. The upper surface of the plaster cast should be made as smooth as possible to ensure that unwanted irregularities do not appear in the cushion to be produced. Wrinkles in the cover 20 can be removed by hand in a smoothing action to ensure that the cover is in tight fitting relation to the underlying plaster cast and inner surfaces of the metal pan 12. A release agent, such as vaseline, should be spread over the upper surface of the plaster cast in order to prevent a vinyl cover from sticking to the cast. In the case of a cloth cover, a sheet of plastic wrap may be stretched over the top of the plastic cast as well as over the inside of the metal pan 12 in order to prevent the cloth from sticking to the plaster mold. The aforementioned metal stripes 18a–18d are rigidly held in position by conventional means such as clamps, which are not shown in the figure for simplicity.

A heater (also not shown) is positioned approximately eight inches above the open metal pan 12 in order heat the cover 20. After a brief heating period, e.g., on the order of three minutes, the vacuum source 15 is turned on whereupon the cover 20 is drawn under vacuum in close conformance with the outer surface of the plaster cast and inner surfaces of the metal pan 12. The cover 20 while under vacuum may be manually worked in a downward direction toward the bottom of the metal pan 12 in order to eliminate unwanted wrinkles in the cover material. Once the cover 20 is drawn in tight fitting contact with the plaster mold and the inner surfaces of the metal pan 12, the inside surface of the cover should be cleaned using a conventional solvent such as a rubber solvent on a rag. All particles and debris should thus be removed from the inside surface of the cover 20.

Referring to FIG. 2, there is shown foam 26 in fluid form being poured from a dispenser, or pitcher, 28 into the open, recessed portion of the metal pan 12 and onto the cover 20. Disposed on the facing inner surfaces of the cover 20 within the recessed portion of the metal pan 12 are a plurality of support inserts 22a–22d. Each of the support inserts is preferably comprised of a small block of foam rubber and is attached to the inner surface of the cover 20 by conventional means such as an epoxy glue. Each of the support inserts 22a–22d is positioned adjacent to the upper edge of the metal pan 12 and is affixed to the inner surface of the cover 20. The recessed, inner portion of the metal pan 12 over which the cover 20 is spread is filled with the foam 26 up to the location of the aforementioned support inserts 22a–22d. In forming the foam core of the cushion, the foam 26 is deposited in the metal pan 12 approximately up to the level of the aforementioned support inserts 22a–22d. The foam used in a preferred embodiment is a conventional mixture of iso and resin which requires mixing for approximately 10 seconds at high speed. This mixture expands while curing so that the foam should be poured almost up to the support inserts 22a–22d so that it extends up to the support inserts, and no higher, after curing.

Once the foam 26 is poured into the pan 12 and allowed to expand to the level of the four support inserts 22a–22d, a rigid base 30 preferably comprised of 7-ply birch plywood bonded to ABS plastic 1/16 inch thick is positioned over the foam as it cures. The steps of pouring the foam 28, positioning the base 30 over the curing foam, and clamping the base in position using conventional means (not shown) are performed within 15–20 seconds. A plurality of spacers 32a, 32b and 32c are positioned between respective edges of the plywood base 30 and the upper lip of the metal pan 12 to provide a gap around the periphery of the plywood base for allowing gases generated during curing of the foam to escape from the cushion. Once proper spacing between the edges of the plywood base 30 and the upper lip of the metal pan 12 is attained, a metal pressure plate 34 is positioned over the metal pan 12 and plywood base 30 during curing of the foam core of the cushion. It is important that the gap between the edges of the plywood base 30 and the upper lip of the metal pan 12 be uniform in order to allow for complete and uniform escape of the gases from the foam as it cures. Failure of these gases to escape from the foam will result in the formation of bubbles in the cured foam cushion. A bond is formed between the plywood base 30 and the upper surface of the foam as it cures.

Referring to FIG. 4, there is shown a partially cutaway perspective view of a contoured cushion 40 formed in accordance with the principles of the present invention. The cushion 40 includes a recessed upper, center portion 40a adapted for receiving, in this case, a seat support surface of a user. A pair of spaced thin lateral supports 38a, 38b are disposed immediately adjacent to and outward from the recessed center portion 40a of the cushion 40. The lateral supports 38a, 38b provide support for the cushion user and ensure his or her stable positioning upon the cushion 40. The cushion's cover 43 may be either vinyl or cloth, or of any of the more conventional covering materials. The cushion 40 further includes an inner foam core 26 which adheres to and is integral with the cushion's cover 43. The inner foam core 26 further adheres to and is integral with the plywood base 30 which forms the lower surface of the cushion. The rigid plywood base 30 affords a high degree of support for a cushion user and facilitates mounting of the cushion 40 in virtually any support base and its secure attachment thereto.

Referring to FIG. 5, there is shown an arrangement for providing a soft spot in a foam cushion in accordance with another aspect of the present invention. The soft spot is comprised of a cushion insert of foam softer than the foam composition of the remaining portion of the cushion's inner core to prevent the formation of pressure sores in those areas of high pressure such as caused by bony protuberances. In the arrangement of FIG. 5, a plaster cast 42 formed in accordance with the seating surface contour of an intended user is positioned within and rests on the bottom of the metal pan 12. That portion of the plaster cast 42 in conformance with the legs of the user is positioned in abutting contact with an inner lateral surface of the metal pan 12 defining the recessed center portion 14 thereof. In accordance with the present invention, a soft spot insert 44 is positioned upon and attached to a designated area 42a on the plaster cast 42. The designated area 42a represents an area of high support pressure in the cushion to be produced, in which a foam insert having a softer composition will be placed as described below. The insert 44 is preferably comprised of a crepe-like material cut to the desired shape of the soft spot. If the soft spot is large or positioned in an unstable location on the plaster cast 42, it may be necessary to secure the crepe insert 44 to the plaster cast by conventional means such as mounting pins, or screws, 45. If mounting screws 45 are used for positioning of the soft spot insert 44, tape should be placed over the exposed ends of the screws so as to avoid a screw imprint on the cushion's cover after a vacuum is applied to the cover.

Figures 6, 7, 8, 9, 10:
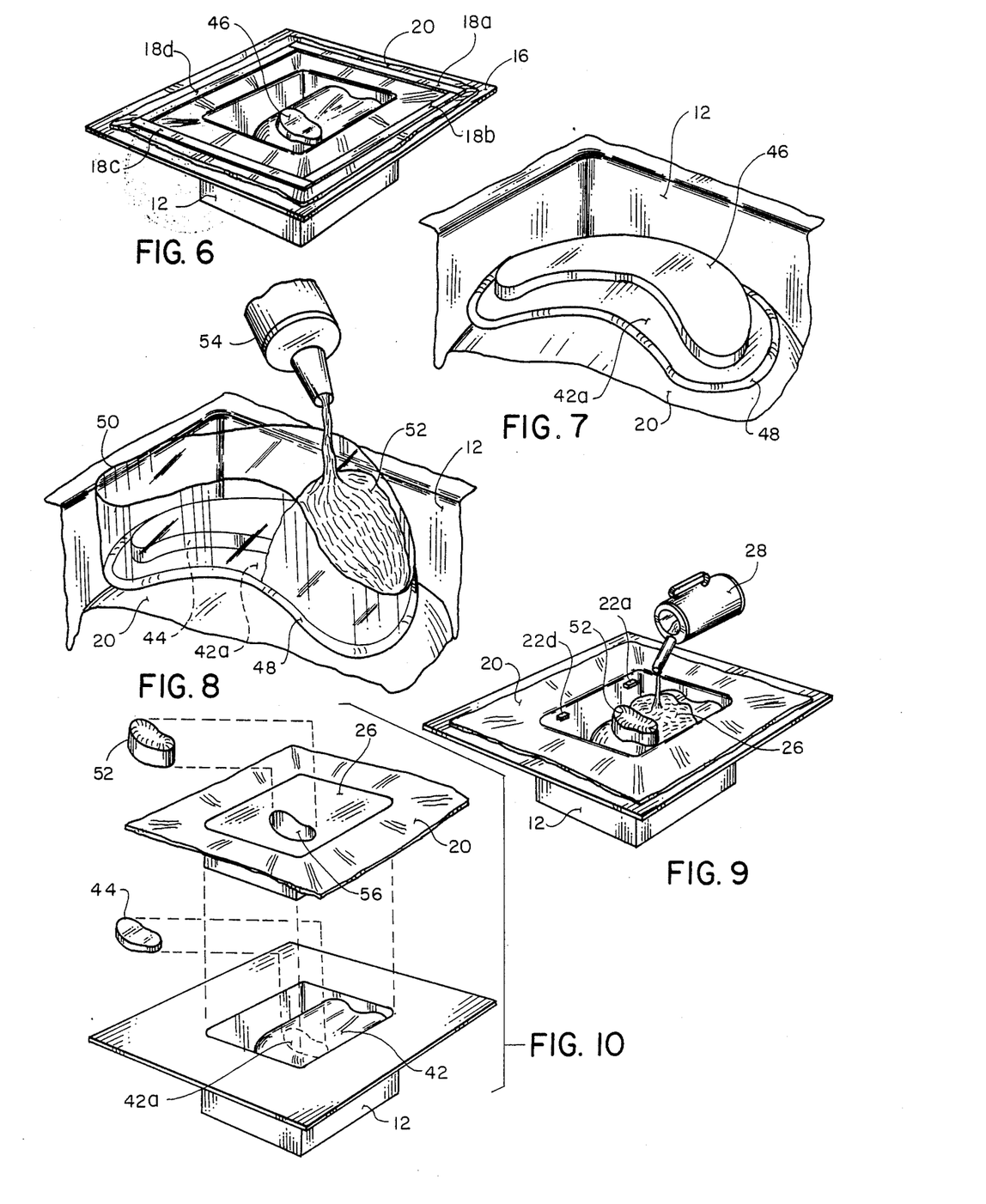

As shown in FIG. 6, the cushion's cover 20 is then placed over the plaster cast as well as over the soft spot insert, forming an upraised portion 46 on the mold. The upraised portion 46 is positioned at the location of the soft spot to be incorporated in the cushion being fabricated. As previously described, the cover 20 covers the entire interior of the metal pan 12 and extends outward over the outer peripheral flat platform 16. The cover is maintained tightly stretched over the interior of the metal pan 12 and plaster cast by means of a vacuum applied thereto through the bottom of the metal pan and the plurality of metal strips 18a–18d disposed about the periphery of the cover in the form of a unitary, rectangular frame.

As shown in FIG. 7, a peripheral strip 48 preferably comprised of a flexible material such as rubber is then positioned about the upraised portion 46 on the surface of the plaster cast. The peripheral strip 48 is securely attached to the inner surface of the cover 20 by conventional adhesive means such as an epoxy glue and defines a designated area 42a on the surface of the plaster cast.

The next step in forming the soft spot is illustrated in FIG. 8 where a contoured plastic sheet 50 is shown positioned in contact with the peripheral strip 48 so as to extend upward from the cover 20 disposed on the plaster cast. With the plastic sheet 50 in contact with and extending upward from the peripheral strip 48, the space within the plastic sheet is positioned above the designated area 42a. A temporary foam plug 52 is then deposited inside the peripheral strip 48 so as to fill up the space above the designated area 42a. The temporary foam plug 52 is deposited by means of a foam dispenser 54 and is confined within the designated area 42 by means of the contoured plastic sheet 50. The temporary foam plug 52 is deposited to a depth such that it is level with the top of the metal pan 12 as shown in FIG. 9 and is allowed to cure. As further shown in FIG. 9, a second type of foam 26 is then deposited by means of a foam dispenser 28 into the metal pan 12 and onto the cover 20 so as to surround the temporary foam plug 52. The temporary foam plug 52 is firmer than the second type of foam 26 allowing it to maintain its shape and occupy the space above the designated area 42a as the second type of foam is poured.

After the foam 26 is allowed to cure, the temporary foam plug 52 is then removed from the thus produced dual foam cushion as shown in FIG. 10. The temporary foam plug 52 may be removed by cutting it from the more rigid surrounding foam 26 of the cushion. With the temporary foam plug 52 cut out of the foam cushion and the foam cushion removed from the metal pan 12, the soft spot insert 44 is then removed from the surface of the plaster cast 42. The cushion is then placed back in the metal pan 12 as shown in FIG. 11 and now includes a hollow 56 formed by removal of the temporary foam insert from the cushion.

Figures 11, 12, 13, 14:
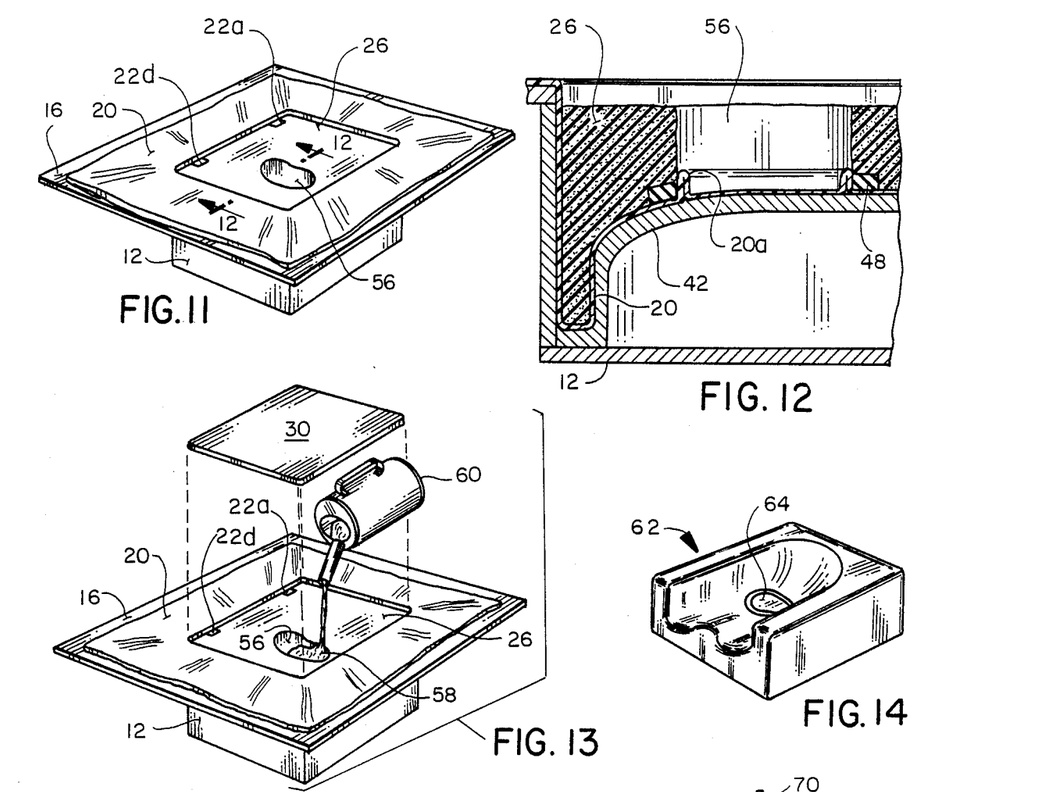
FIG. 12 is a sectional view taken along sight line 12—12 in FIG. 11 illustrating details of the structure of a cushion prior to incorporating a softer foam insert for forming a soft spot.
FIG. 13 is a perspective view showing the manner in which a softer foam insert is incorporated in the cushion as well as the manner in which a rigid base is attached thereto.
FIG. 14 is a perspective view of the cushion with the incorporated softer foam insert.

Referring to FIG. 12, which is a sectional view taken along sight line 12—12 in FIG. 11, there are shown details of the thus formed cushion having a hollow 56 within its foam interior 26. As shown in FIG. 12, the crepe soft spot insert has been removed from the surface of the plaster cast 42 and the cushion's cover 20 extends over the entire outer surface of the plaster cast. With a vacuum applied to the cover 20 through the bottom of the metal pan 12, an upraised portion, or ridge, 20a of the cover is then manually formed around and within the hollow 56 in the cushion's foam interior 26. The upraised portion 20a of the cover 20 provides additional cover material within the soft spot area to allow for increased displacement of the cover due to the different underlying foam materials.

With the cushion returned to the metal pan 12 as shown in FIG. 13 and a vacuum applied to the cushion, an adhesive is deposited around the hollow 56 within the cushion's foam interior 26. A plastic wrap is then disposed over the upper surface of the foam 26, and an aperture is cut in the plastic wrap around the hollow 56 in the foam 26. The plastic wrap is not shown in the figure for simplicity. A softer foam 58, or special pressure reducing foam to provide pressure relief over the soft area, is deposited from a foam dispenser 60 into the hollow 56 of the cushion's foam core 26. The aforementioned plastic wrap, which is removed later, prevents the softer foam from being deposited on the cushion's foam core. Following deposit of the softer foam 56 in the cushion's hollow 56, paper (also not shown for simplicity) may be positioned over the soft spot area so that the softer foam doesn't stick to the inner surface of the plywood base 30 positioned over the open upper end of the metal plate 20 and in contact with the lower surface of its foam interior. However, the use of such paper is not absolutely essential in forming the cushion's soft spot. The peripheral strip 48 facilitates formation of the upraised portion 20a of the cover 20 and provides support continuity between the cushion's foam core 26 and the softer foam deposited in the cushion's hollow 56. The soft spot foam as it cures becomes bonded to the cushion's foam core 26 disposed about its hollow 56 as well as to that portion of the cushion's cover disposed over the hollow in the cushion.

Referring to FIG. 14, there is shown a cushion 62 having a soft spot 64 formed in accordance with the present invention. As described above, disposed immediately beneath the soft spot 64 is a generally a cylindrical shaped plug of foam which is softer than the foam in the remaining portion of the cushion's interior. That portion of the cover immediately over the soft spot 64 is continuous and integral with the remaining portion of the cushion's cover. The portion of the cover surrounding the soft spot 64 has been shaped in the form of a lip as described above and shown in the sectional view of FIG. 12 to accommodate the difference in firmness of the two types of foam. The soft spot 64 of the present invention is independently sprung within the cushion 62 by means of the aforementioned combination of the peripheral strip 48 and upraised portion 20a of the cover 20 for improved comfort and support stability. A soft spot 64 formed in accordance with the present invention is attractive in appearance, permits the use of a continuous, integral cushion cover, is formed integrally with the cushion's foam interior so as to afford high strength and good support, and essentially eliminates pressure sores arising from extended use of the cushion.

Figures 15, 16, 17:
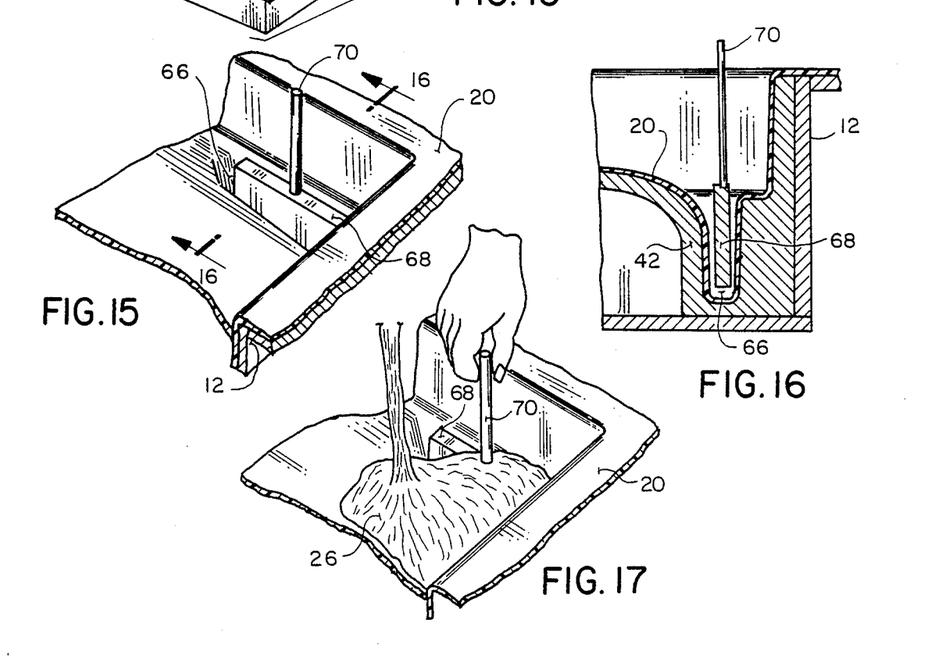
FIGS. 15-17 show various details of the manner in which side supports are incorporated in a contoured support cushion in accordance with the present invention.

Referring to FIGS. 15, 16 and 17, there are shown various views of an arrangement for forming thin lateral supports in a foam filled cushion in accordance with another aspect of the present invention. As shown in FIGS. 15 and 16, the plaster cast 42 is provided with a lateral recess 66 on each side thereof, although only one recess is shown in the figures for simplicity. The lateral recess 66 extends downward to a location adjacent to the bottom of the metal pan 12 as shown in FIG. 16. Before foam is poured over the cushion's cover 20 positioned on the plaster cast 42, a reinforcing member 68 attached to a removable handle 70 is inserted in each of the lateral recesses 66. The reinforcing member 68 is preferably comprised of a type of foam which is more rigid and stronger than the foam used in the remaining interior portion of the cushion, although it may be comprised of virtually any lightweight, rigid, strong material. The foam reinforcing member 68 is pre-formed by conventional means prior to its insertion in the plaster cast 42. With the reinforcing member 68 positioned within lateral recess 66 and manually maintained in position therein by means of the removable handle 70, foam 26 is poured into the metal pan 12 over the cushion's cover 20 as shown in FIG. 17. As the foam 6 cures and after it has sufficiently set so as to become semi-rigid, the handle 70 is removed by hand from the reinforcing member 68 as well as from the cured foam 26.

Figure 18:
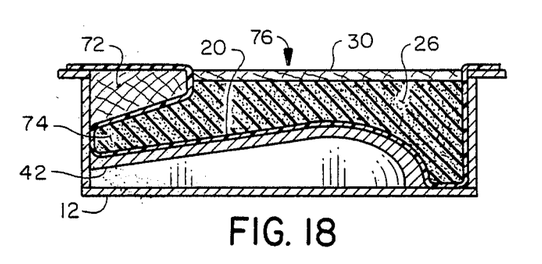
FIG. 18 is a sectional view illustrating an arrangement for incorporating a forward ledge extension in a foam filled cushion for a user having tight hamstrings.
Figure 19:
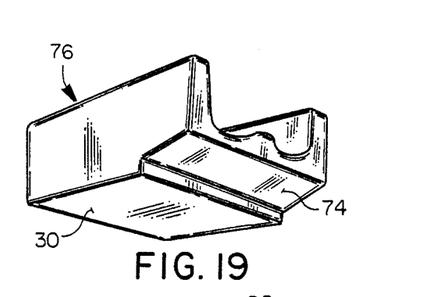
FIG. 19 is a perspective view of a foam filled cushion fabricated using the arrangement of FIG. 18.

Referring to FIG. 18, there is shown a sectional view of an arrangement for forming a foam filled cushion with an undercut front edge for use by persons with tight hamstrings. A perspective view of a cushion 76 formed by the arrangement of FIG. 18 having an undercut front is shown in FIG. 19. As in the previous arrangements, the plaster cast 42 is positioned within and upon the bottom of the metal pan 12. A ledge extension 72 is securely attached to a lateral wall on the inner portion of the metal pan 12 and extends into the recessed, center portion thereof. The ledge extension 72 is preferably comprised of a light weight, strong, rigid material such as wood or plastic and may be attached to the inner surface of the metal pan 12 by conventional means such as an epoxy cement. The ledge extension 72 provides an overhang feature in the mold configuration for forming a cushion with an outer covering 20, an inner foam core 26, and a rigid base 30.

As in previously described embodiments, a cover 20 is positioned over the plaster cast 42 as well as upon all interior surfaces of the metal pan 12 and over the ledge extension 72. It is important that the cover 20 extend fully forward in the metal pan 12 so as to entirely cover the plaster cast 20, the ledge extension 72 and that portion of the pan disposed therebetween. Foam 26 is poured into the metal pan 12 and allowed to set in forming the cushion as previously described. That portion of the inner foam core 26 disposed between the ledge extension 72 and the forward portion of the plaster cast 42 forms an overhang portion 74 of the cushion. The overhang portion 74 of the cushion is positioned beneath and supports the upper legs of a user. The narrow depth of the overhang portion 74 of the cushion permits the legs of a person with tight hamstrings to extend rearward beneath the cushion. The overhang portion 74 of the cushion thus provides support under the knees of the user, and by sloping rearward and downward on the underside of the cushion provides space for the user's lower legs, or calves.

Figure 20:
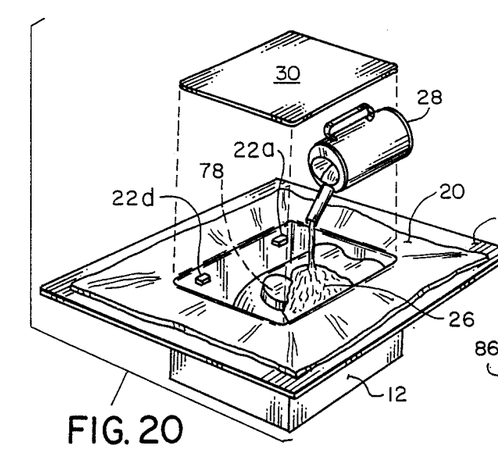
FIGS. 20-22 illustrate a cushion having a soft spot in accordance with another embodiment of the present invention, as well as an arrangement for fabricating such a cushion.

Referring to FIG. 20, there is shown another arrangement for fabricating a cushion having a soft spot in accordance with the principles of the present invention. In the arrangement of FIG. 20, a soft spot plug 78 is affixed to the plaster mold and the open, inner portion of the metal pan 12 is filled with foam 26. With the inner, open portion of the metal pan 12 filled with foam 26 and disposed over the cover 20, the plywood base 30 is positioned over and in contact with the upper surface of the foam which is then allowed to set. Proper positioning of the plywood base 30 adjacent to the upper edges of the metal pan 12 is provided by a plurality of support inserts 20a–20d disposed about the open upper periphery of the metal pan and attached to the inner surface of the cover 20 as previously described.

Figure 21:
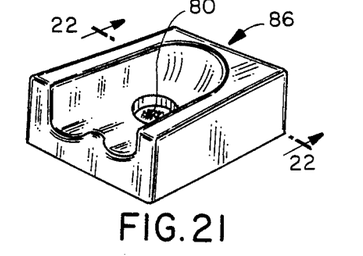
Figure 22:
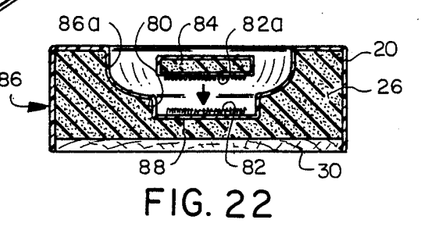

After the cushion 86 is removed from the metal pan 12 following curing of its foam inner core 26, the soft spot plug 78 is removed from the upper, recessed portion of the cushion 86 leaving a depression 80 therein as shown in the perspective view of the cushion in FIG. 21. A sectional view of the cushion shown in FIG. 19 taken along sight line 22—22 is shown in FIG. 22. With the soft spot plug 78 removed, detachable coupling means 82 are attached to the depression 80 of the cushion 86. The detachable coupling means 82 may be conventional in design and operation and in one embodiment take the form of VELCRO strips having hook and loop fastenters. In another embodiment, the soft spot insert may be maintained in position in the cushion by means of its shape. For example, the soft spot insert may be provided with angled sides which are engaged in tight fitting relation by a complementary shaped recessed portion in the cushion with corresponding angled sides. Where the detachable coupling means 82 are sewn to the depression 80 of the cushion 86, a sealing tape 88 should be affixed to the inner surface of the cushion's cover 20 before the foam 26 is added to the metal pan 12 as shown in FIG. 20. The sealing tape 88 prevents leakage of the foam 26 onto the outer surface of the cushion's cover 20. With the detachable coupling means 82 securely affixed to the depression 80 of the cushion 86, complementary coupling means 82a is attached to a soft spot insert 84 adapted for positioning within the depression 80. The soft spot insert 84 is firmly held in position on the cushion 86 by means of the detachable coupling means 82, which permits the soft spot insert to be replaced with another insert having a different degree of softness as desired by the seat user. The soft spot cushion arrangement shown in FIGS. 21 and 22 thus provides the advantage that the degree of softness of the soft spot insert may be selected after the cushion has been fabricated and may be changed in accordance with the desires and needs of the cushion user. While the soft spot insert 84 has thus far been described as comprised of foam, it is not limited to this composition. For example, the soft spot insert 84 may also contain a gel, an air bladder, etc.

Figure 23:
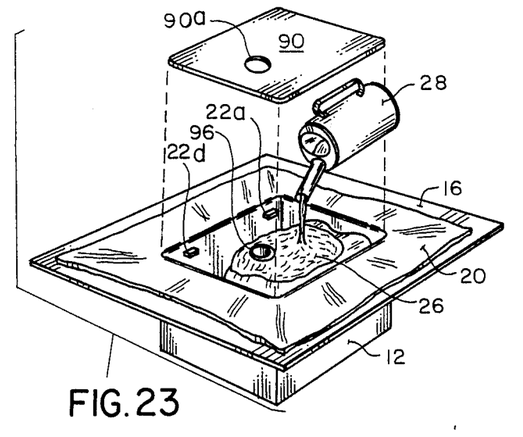
FIGS. 23-25 illustrate a foam filled cushion having an incontinence relief tube therein as well as an arrangement for forming such a cushion in accordance with another aspect of the present invention.
Figure 24:
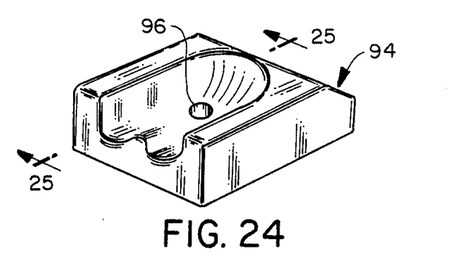

Referring to FIG. 23, there is shown an arrangement for fabricating a cushion 94 as shown in FIG. 24 having an incontinence relief tube 96 therein. As shown in FIG. 23, the incontinence relief tube 96 is positioned in contact with and extends upward from the plaster cast. The upper end of the relief tube 96 extends above the upper edges of the metal pan 12 and through an aperture 90a in the cushion's base 90. The lower end of the relief tube 96 is securely affixed to the upper surface of the plaster cast by conventional adhesive means (not shown). With the relief tube 96 in position on the plaster cast and the cushion cover 20 positioned within and along the length of the relief tube, the foam 26 is deposited within the recessed, center portion of the pan 12 and over the cushion's cover. The foam 26 flows around the relief tube 96 and securely maintains it in position within the cushion 94 after the foam has set. The relief tube 96 extends through a lower portion of the upper, recessed surface of the cushion 94 and allows for the passage of fluids from the cushion's upper support surface, through the cushion, to a location on the underside of the cushion. The cushion's rigid base 90 is provided with an aperture 90a for receiving the lower end of the relief tube 96 as shown in the sectional view of FIG. 25. That portion 20b of the cover 20 disposed over the lower end of the relief tube 96 is removed such as by cutting after the foam cures.

The cushion 94 further includes an angled aft portion 98. By providing a back cushion with a similar facing angled edge portion as the angled aft portion 98 of the seat cushion 94, relative positioning of the two cushions is facilitated. For example, facing angled portions of a pair of seat and back cushions permit very close horizontal and vertical spacing between the two cushions to be achieved while permitting the spacing in both directions to be increased and the relative orientation between the two cushions to be varied, as desired. The angled aft portion 98 of the cushion 94 is preferably disposed on lateral portions of the cushion. A seat cushion may be seven inches high in the front and four inches high in the back. The angled adjacent portions of a pair of seat and back cushions allow the back cushion to be positioned very low relative to the seat cushion. This permits the back cushion to provide upper pelvic support even with a thick seat cushion. This is important because when adjusting the angle between the seat and back cushions, upper pelvic support should be related to the angle of the back cushion, rather than the seat cushion.

Figure 25:
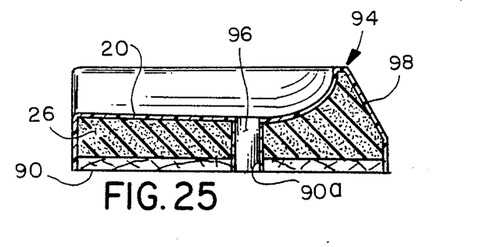
Figure 26:
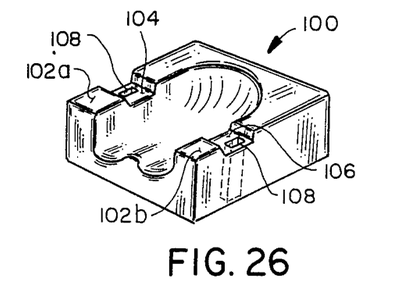
FIG. 26 is a perspective view of a foam filled cushion having lap belt access holes and recesses in accordance with another aspect of the present invention.

Referring to FIG. 26, there is shown a perspective view of a cushion 100 having additional features in accordance with other aspects of the present invention. The cushion 100 includes a pair of lap belt slots 108 (only one of which is shown in FIG. 25 for simplicity). The lap belt slots 108 are formed in a manner similiar to that in which the incontinence relief tube is incorporated in the embodiment of FIGS. 24 and 25 and allow for a lap belt to be inserted through the cushion 100 for securely maintaining a user in position thereon. The cushion 100 further includes a pair of lap belt recesses 104 and 106 which are adapted to receive respective portions of a lap belt and maintain the lap belt securely in position upon the cushion 100 and disposed about a user of the cushion.

There has thus been shown a vacuum formed, foam filled seat or back cushion having a foam inner core, an outer covering, and a rigid base integral with the foam core which provides improved support and facilitates attachment of the cushion to a support base, such as a wheelchair. The inner foam core is comprised primarily of a first type of foam having a given rigidity, or hardness, and a second type of foam which is softer than the first type of foam and forms a soft spot in the cushion. The soft spot is positioned beneath an area of high support pressure to eliminate pressure sores. The foam soft spot is molded integral with the rest of the cushion for improved support and strength, while the cover is continuous over the entire cushion including the area adjacent to the soft spot for improved appearance and durability. Another aspect of the invention contemplates a removable soft spot insert which may be attached to or removed from a depression in the cushion's support surface, as desired. This allows the degree of softness of the insert to be selected in accordance with a cushion user's comfort and support needs. Other embodiments of the invention contemplate high strength, narrow reinforcing members molded integrally with the foam cushion for user lateral support and various types of apertures extending through the cushion which are formed as the cushion is molded. An additional feature of the invention is the incorporation of a forward, overhang edge portion of the cushion which provides support for a cushion user's upper legs while allowing the user's lower legs to extend rearward such as for a user having tight hamstrings.

While particular embodiments of the present invention have been shown and described, it will be obvious to those skilled in the art that changes and modifications may be made without departing from the invention in its broader aspects. For example, while a cushion incorporating the various features described herein is disclosed as including a rigid base such as of plywood, cushions incorporating the various other features of the present invention do not necessarily have to include a rigid base as disclosed herein. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their perspective based on the prior art.

I claim:

1. A support cushion adapted for attachment to and mounting in a support base, said cushion comprising:
   a compressible, resilient core comprised of a curable foam and having a contoured upper surface and a generally planar lower surface;
   a rigid, generally planar base engaging and integrally bonded to the lower surface of said core;
   positioning means comprised of a plurality of inserts disposed within said core for maintaining said base in intimate contact with the lower surface of said core during the curing thereof so as to form an integral bond between said core and said base; and
   a flexible cover disposed about and integrally bonded to the contoured upper surface of said core, wherein said plurality of inserts are attached in a spaced manner to an inner surface of said cover adjacent to the lower surface of said core.

2. The support cushion of claim 1 wherein said core and each of said inserts is comprised of a curable foam material.

3. The support cushion of claim 2 wherein a peripheral edge of said base is disposed inwardly in spaced relation from an edge of the lower surface of said core to allow for escape of gases from said foam core during the curing thereof.

4. The support cushion of claim 1 wherein said base is comprised of wood.

5. The support cushion of claim 1 further comprising a flexible cover disposed about and integrally bonded to the contoured upper surface of said core, and wherein said core is comprised of a first foam material.

6. The support cushion of claim 5 further comprising a compressible, resilient insert disposed within and bonded to said core, wherein said insert is softer than the first foam of said core to provide the support cushion with a soft spot to eliminate pressure sores.

7. The support cushion of claim 6 wherein said insert is comprised of a second foam material which is softer than the first foam material of said core.

8. The support cushion of claim 6 wherein said insert includes a gel which is softer than the first foam material of said core.

9. The support cushion of claim 6 wherein said cover includes a folded portion disposed between adjacent upper portions of said core and said insert to accommodate the softer insert in preventing stretching and tearing of said cover.

10. The support cushion of claim 1 wherein said core includes a depression on an upper surface thereof, and said support cushion further includes an insert disposed within said depression and coupling means for removably attaching said insert to the depression on said core.

11. The support cushion of claim 10 wherein said core is comprised of a first foam and said insert is comprised of a second foam and wherein said second foam is softer than said first foam.

12. The support cushion of claim 11 wherein said coupling means includes a plurality of hook and loop fasteners.

13. The support cushion of claim 1 further comprising an incontinence relief tube disposed within said core and extending between its upper and lower surfaces and through said base.

14. A support cushion adapted for attachment to and mounting in a support base, said cushion comprising:
 a compressible, resilient core comprised of a curable foam and having a contoured upper surface and a generally planar lower surface;
 a rigid, generally planar base engaging and integrally bonded to the lower surface of said core;
 positioning means disposed within said core for maintaining said base in intimate contact with the lower surface of said core during the curing thereof so as to form an integral bond between said core and said base; and
 lateral reinforcement means disposed within respective side portions of said core for providing lateral support for a cushion user, wherein said core is comprised of a first foam and said lateral reinforcement means comprises a second foam and wherein said second foam is more rigid and stronger than said first foam.

15. The support cushion of claim 14 wherein said cushion includes right and left thin lateral sides and said lateral reinforcement means includes first and second foam inserts respectively disposed in said right and left thin lateral sides.

16. A support cushion having a soft spot to compensate for areas of high support pressure and eliminate pressure sores, said support cushion comprising:
 a compressible, resilient core comprised of a first foam and having an upper contoured surface and a lower planar surface;
 a compressible, resilient insert disposed within and bonded to said core and extending between the upper and lower surfaces thereof, wherein said insert is comprised of a second foam which is softer than the first foam of said core to provide the cusion with a soft spot;
 a flexible cover disposed in tight fitting relation over the upper surfaces of said core and said insert, said cover including a folded portion disposed between adjacent upper portions of said core and said insert to accommodate the softer insert in preventing stretching and tearing of said cover;
 a rigid, generally planar base engaging and integrally bonded to the lower surface of said core; and
 positioning means comprised of a plurality of inserts disposed within said core and attached in a spaced manner to an inner surface of said cover adjacent the lower surface of said core for maintaining said base in intimate contact with the lower surface of said core during the curing thereof so as to form an integral bond between said core and said base.

* * * * *

UNITED STATES PATENT AND TRADEMARK OFFICE
CERTIFICATE OF CORRECTION

PATENT NO. : 4,951,336
DATED : August 28, 1990
INVENTOR(S) : Michael W. Silverman It is certified that error appears in the above-identified patent and that said Letters Patent is hereby corrected as shown below:

Col. 10 / Line 68: "cver" should be --over--.

Col. 14 / Lines 18-19: "custion" should be --cushion--.

Signed and Sealed this

Sixteenth Day of March, 1993

Attest:

STEPHEN G. KUNIN

Attesting Officer

Acting Commissioner of Patents and Trademarks